(12) United States Patent
Angadi et al.

(10) Patent No.: US 10,560,522 B2
(45) Date of Patent: Feb. 11, 2020

(54) METHOD, SYSTEM AND APPARATUS FOR DYNAMICALLY ASSIGNING MASTER DEVICES IN COMMUNICATION SESSIONS

(71) Applicant: Zebra Technologies Corporation, Lincolnshire, IL (US)

(72) Inventors: Sateesh V. Angadi, Bangalore (IN); Keerthana Kalyanasundaram, Bangalore (IN); Shruti Hiremath, Bangalore (IN); Sandeep Ramakrishnan, Bangalore (IN)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 15/990,068

(22) Filed: May 25, 2018

(65) Prior Publication Data

US 2019/0364104 A1 Nov. 28, 2019

(51) Int. Cl.
| | | |
|---|---|---|
| *H04L 9/00* | (2006.01) | |
| *H04L 29/08* | (2006.01) | |
| *H04L 29/06* | (2006.01) | |
| *H04W 4/06* | (2009.01) | |
| *H04W 76/14* | (2018.01) | |
| *H04W 84/20* | (2009.01) | |
| *H04W 84/12* | (2009.01) | |

(52) U.S. Cl.
CPC .......... *H04L 67/1051* (2013.01); *H04L 69/24* (2013.01); *H04W 4/06* (2013.01); *H04W 76/14* (2018.02); *H04W 84/12* (2013.01); *H04W 84/20* (2013.01)

(58) Field of Classification Search
CPC ... H04L 67/104; H04L 67/1051; H04L 63/08; H04L 63/20; H04L 63/205; H04L 12/2668; H04L 12/2671; H04L 12/2673; H04L 43/0876; H04L 43/0882; H04L 43/0888; H04L 67/2828; H04W 4/08; H04W 12/06; Y02D 70/20; Y02D 70/142; Y02D 70/144; Y02D 70/164
See application file for complete search history.

(56) References Cited

U.S. PATENT DOCUMENTS

| | | | | |
|---|---|---|---|---|
| 2008/0313698 | A1* | 12/2008 | Zhao | H04L 63/08 726/1 |
| 2010/0046468 | A1* | 2/2010 | Oi | H04W 84/20 370/331 |
| 2011/0026504 | A1* | 2/2011 | Feinberg | H04W 4/08 370/338 |

(Continued)

*Primary Examiner* — Jung Liu (57) ABSTRACT

A method of dynamically selecting a master device for a communication session from a set of peer devices includes: at a first device of the set of peer devices, transmitting local capability data to a second device of the set of peer devices, the local capability data defining an operational capability of the first device; at the first device, receiving remote capability data from the second device, the remote capability data defining an operational capability of the second device; comparing the local and remote capability data at the first device; based on the comparison, determining, at the first device, whether to establish the communication session as a master device; at the first device, establishing the communication session with the second device according to the determination.

17 Claims, 8 Drawing Sheets

(56) References Cited

U.S. PATENT DOCUMENTS

| | | | | |
|---|---|---|---|---|
| 2011/0082939 A1* | 4/2011 | Montemurro | ......... | H04W 76/14 |
| | | | | 709/227 |
| 2013/0132500 A1* | 5/2013 | Vandwalle | ............ | H04L 67/104 |
| | | | | 709/208 |
| 2015/0127733 A1* | 5/2015 | Ding | ....................... | H04W 4/08 |
| | | | | 709/204 |

* cited by examiner

METHOD, SYSTEM AND APPARATUS FOR DYNAMICALLY ASSIGNING MASTER DEVICES IN COMMUNICATION SESSIONS

BACKGROUND

Wireless communication devices, such as smartphones, laptop computers and the like, are enabled by some communication protocols to establish connections in the absence of a dedicated access point such as a wireless router. For example, the Wi-Fi Direct standard established within the IEEE 802.11 family of wireless protocols enables communication between devices in the absence of dedicated access points. Such connections may be referred to as peer-to-peer connections, although typically in implementing such connections, one of the participating devices may be assigned a "group owner" role, and thus provide certain functionality that would conventionally be provided by a dedicated access point. The performance of the group owner role carries an additional computational burden, however, and performance of the connection may suffer when the device assigned as group owner is unable to support that computational burden.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Examples disclosed herein are directed to a method of dynamically selecting a master device for a communication session from a set of peer devices, the method comprising: at a first device of the set of peer devices, transmitting local capability data to a second device of the set of peer devices, the local capability data defining an operational capability of the first device; at the first device, receiving remote capability data from the second device, the remote capability data defining an operational capability of the second device; comparing the local and remote capability data at the first device; based on the comparison, determining, at the first device, whether to establish the communication session as a master device; at the first device, establishing the communication session with the second device according to the determination.

Additional examples disclosed herein are directed to a computing device, comprising: a communications interface controllable to establish a communication session with a set of peer devices; and a processor connected with the communications interface, the processor configured to: transmit local capability data via the communications interface to a second device of the set of peer devices, the local capability data defining an operational capability of the computing device; receive, via the communications interface, remote capability data from the second device, the remote capability data defining an operational capability of the second device; compare the local and remote capability data; based on the comparison, determine whether to establish the communication session with the computing device as a master device; establish the communication session with the second device according to the determination.

Further examples disclosed herein are directed to a non-transitory computer-readable medium storing a plurality of executable instructions executable by a processor of a computing device to: transmit local capability data via a communications interface of the computing device to a second device of the set of peer devices, the local capability data defining an operational capability of the computing device; receive, via the communications interface, remote capability data from the second device, the remote capability data defining an operational capability of the second device; compare the local and remote capability data; based on the comparison, determine whether to establish the communication session with the computing device as a master device; establish the communication session with the second device according to the determination.

Figure 1:
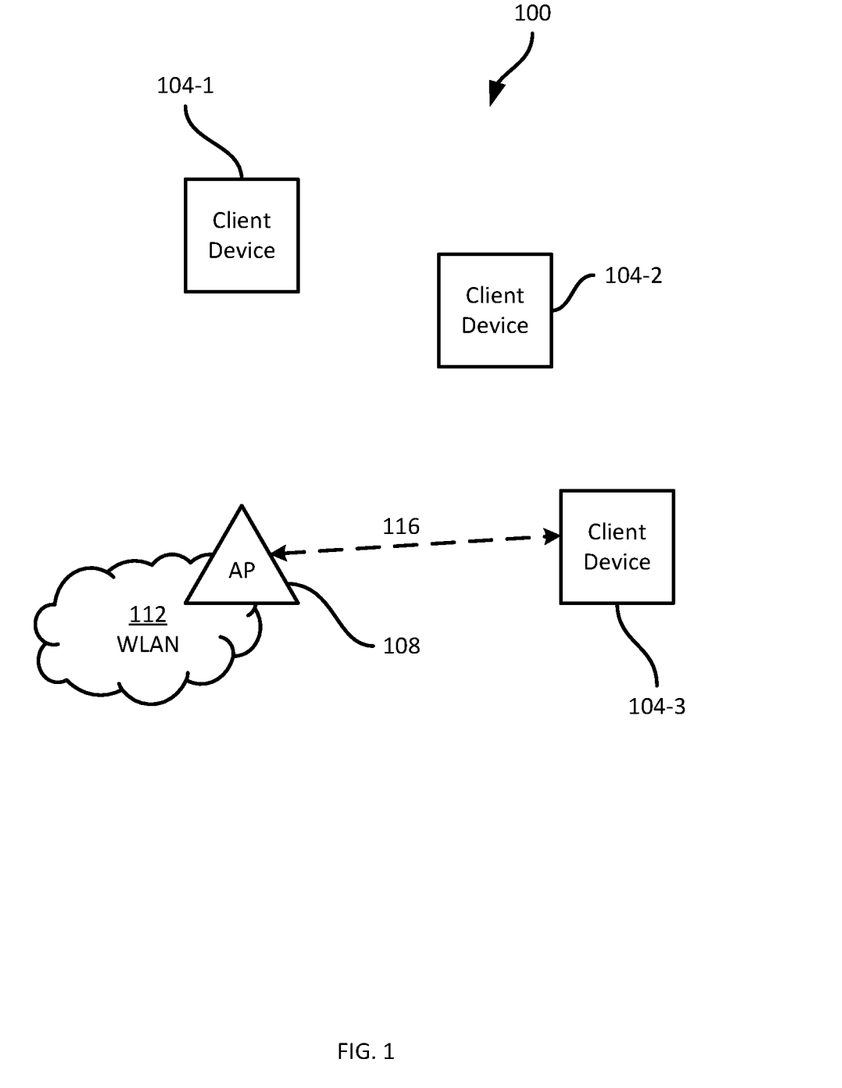
FIG. 1 is a block diagram of a communication system.

FIG. 1 depicts a wireless communications system 100, including a plurality of wireless client devices 104, of which three example devices 104-1, 104-2 and 104-3 are shown (collectively referred to as client devices 104, and generically referred to as a client device 104; this nomenclature may also be used elsewhere herein). The system 100 can include fewer client devices (e.g., two client devices 104), or a greater number of client devices than the three devices 104 illustrated in FIG. 1.

Each client device 104 is a wireless computing device, and may be mobile (e.g., portable) or stationary (e.g. fixed to a support surface). Accordingly, each client device 104 includes any of a smart phone, a laptop computer, a desktop computer, a tablet computer, a handheld data capture device such as a barcode scanner, and the like. The client devices 104, as will be discussed in greater detail, below, each include communication interfaces enabling the devices 104 to establish communication sessions with other computing devices. Such communication sessions can be established, for example, between a client device 104 and an access point 108 (e.g. a wireless router) of a wireless local-area network (WLAN) 112. As will be apparent to those skilled in the art, the access point 108 may also be a component of a wide-area network (e.g. a cellular network), or the WLAN 112 may be connected to a wide-area network (e.g. the Internet, not shown). An example connection 116 is shown between the client device 104-3 and the access point 108. The connection 116 may be established, for example, according to a suitable one of the IEEE 802.11 family of wireless protocols (that is, the connection 116 is a Wi-Fi connection).

Each client device 104 is also enabled to establish communication sessions directly with other client devices 104, without the access point 108. Examples of such direct sessions are sessions established according to the Wi-Fi Direct standard. As will now be apparent to those skilled in the art, a Wi-Fi Direct session is established between two or more devices 104 via a discovery mechanism, followed by a negotiation mechanism for selecting which of the participating devices 104 will act as a master device (referred to as a group owner in Wi-Fi Direct sessions). The master device implements certain access point functionality, such as maintaining network addresses for the devices participating in the session. For example, in a Wi-Fi Direct session, the master device may operate as a dynamic host configuration protocol (DHCP) server, maintaining Internet Protocol (IP) addresses for each device 104 participating in the session.

The above-mentioned negotiation mechanism in a typical Wi-Fi Direct session is performed via the generation of a random intent parameter (also referred to as an intention parameter), for example having a value between zero and fifteen, by each participating device 104. The devices 104 are configured to exchange the intent parameters, and the device having the greatest intent parameter is configured to operate as the master device. Further, in a typical Wi-Fi Direct session, the group owner cannot be changed once the session is established. Thus, for a different device to act as the group owner, the session must be ended and re-established.

As will be discussed in greater detail below, in the system 100, in contrast with the above-mentioned arrangement, the devices 104 are configured to exchange and compare data defining operational capabilities of the devices prior to negotiating which device 104 will act as the master device. Further, the devices 104 are configured to enable a different master device to be selected without ending the session.

Figure 2:
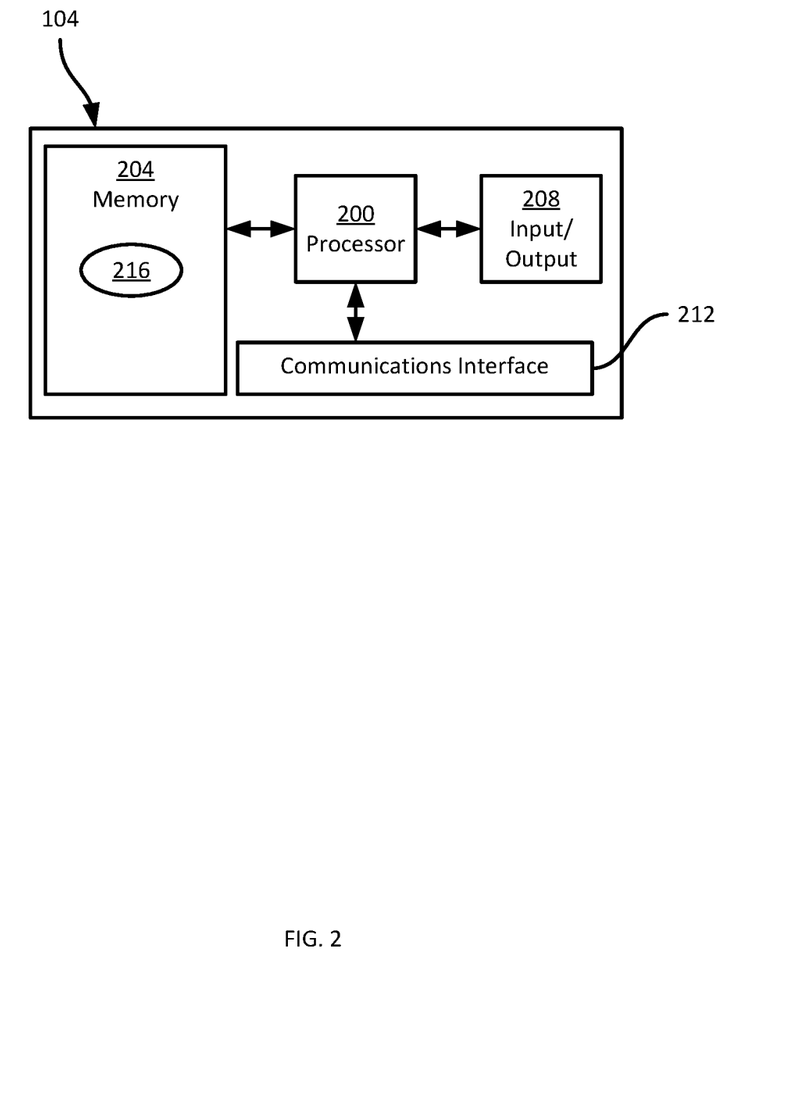
FIG. 2 is a block diagram of certain internal hardware components of the client devices of FIG. 1.

Before a discussion of the functionality implemented by the client devices 104 to enable the comparison of operational capabilities noted above, certain internal components of the devices 104 will be discussed with reference to FIG. 2. Each of the client devices 104 in the system 100 includes the components shown in FIG. 2, although the client devices 104 may have heterogeneous form factors and implementations of the components shown. FIG. 2, in other words, illustrates certain components of a generic client device 104.

The client device 104 includes a central processing unit (CPU), also referred to as a processor 200, interconnected with a non-transitory computer readable storage medium, such as a memory 204. The memory 204 includes any suitable combination of volatile (e.g. Random Access Memory (RAM)) and non-volatile (e.g. read only memory (ROM), Electrically Erasable Programmable Read Only Memory (EEPROM), flash) memory. The processor 200 and the memory 204 each comprise one or more integrated circuits (ICs).

The device 104 also includes at least one input device, and at least one output device, illustrated in FIG. 2 as an input/output device 208 interconnected with the processor 200. The input device includes any suitable one, or any suitable combination of, a touch screen, a keypad, a trigger (e.g. to initiate the performance of any encoding task), a keyboard, a mouse, and the like. The output device includes any suitable one, or any suitable combination of a display (e.g., integrated with the above-mentioned touch screen), a speaker, and the like. The input/output device 208 is configured to receive input and provide data representative of the received input to the processor 200, and to receive output from the processor 200 and present the output, e.g. via the emission of sound from the speaker, the rendering of visual indications on the display, and the like.

The client device 104 also includes a communications interface 212, enabling the client device 104 to exchange data with other computing devices, including other client devices 104, the access point 108, and the like. The communications interface 212 includes any suitable hardware (e.g. transmitters, receivers, network interface controllers and the like) allowing the device 104 to communicate, e.g. according to a suitable one of the Wi-Fi protocols.

The components of the client device 104 are interconnected by communication buses (not shown), and powered by a battery or other power source, over the above-mentioned communication buses or by distinct power buses (not shown).

The memory 204 of the client device 104 stores a plurality of applications, each including a plurality of computer readable instructions executable by the processor 200. The execution of the above-mentioned instructions by the processor 200 causes the client device 104 to implement certain functionality, as discussed herein. The applications are therefore said to be configured to perform that functionality in the discussion below. In the present example, the memory 204 of the device 104 stores a communication control application 216, also referred to herein as the application 216. The client device 104 is configured, via execution of the application 216 by the processor 200, to exchange data defining operational capabilities with other client devices prior to the establishment of a direct communication session (i.e. without the access point 108), and to determine whether the client device 104 will act as the master device in establishing the session based on a comparison of the operational capabilities.

In other examples, the processor 200, as configured by the execution of the application 216, is implemented as one or more specifically-configured hardware elements, such as field-programmable gate arrays (FPGAs) and/or application-specific integrated circuits (ASICs).

Figure 3:
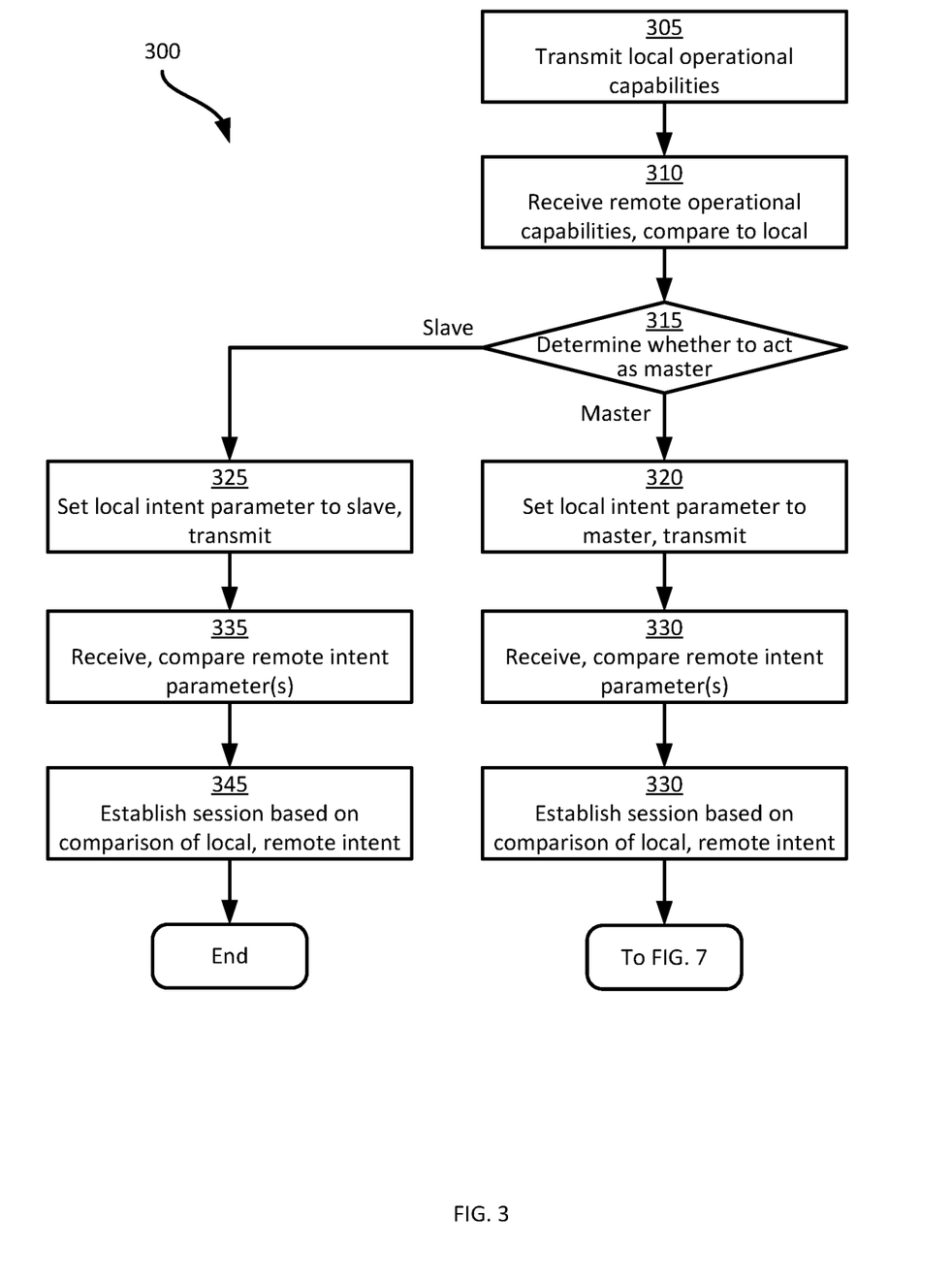
FIG. 3 is a flowchart of a method for dynamically selecting a master device for a communication session from a set of peer devices.

Turning now to FIG. 3, a method 300 of dynamically selecting a master device for a communication session from a set of peer devices is illustrated. In particular, the method 300 illustrates actions taken by the client devices 104 when establishing a new communication session. Additional functionality associated with the modification of an existing session will be described further below. The method 300 will be described in conjunction with its performance in the system 100, and in particular by the client devices 104. That is, when two or more client devices 104 seek to establish a new direct communication session, each of the client devices 104 performs the method 300.

Figure 4:
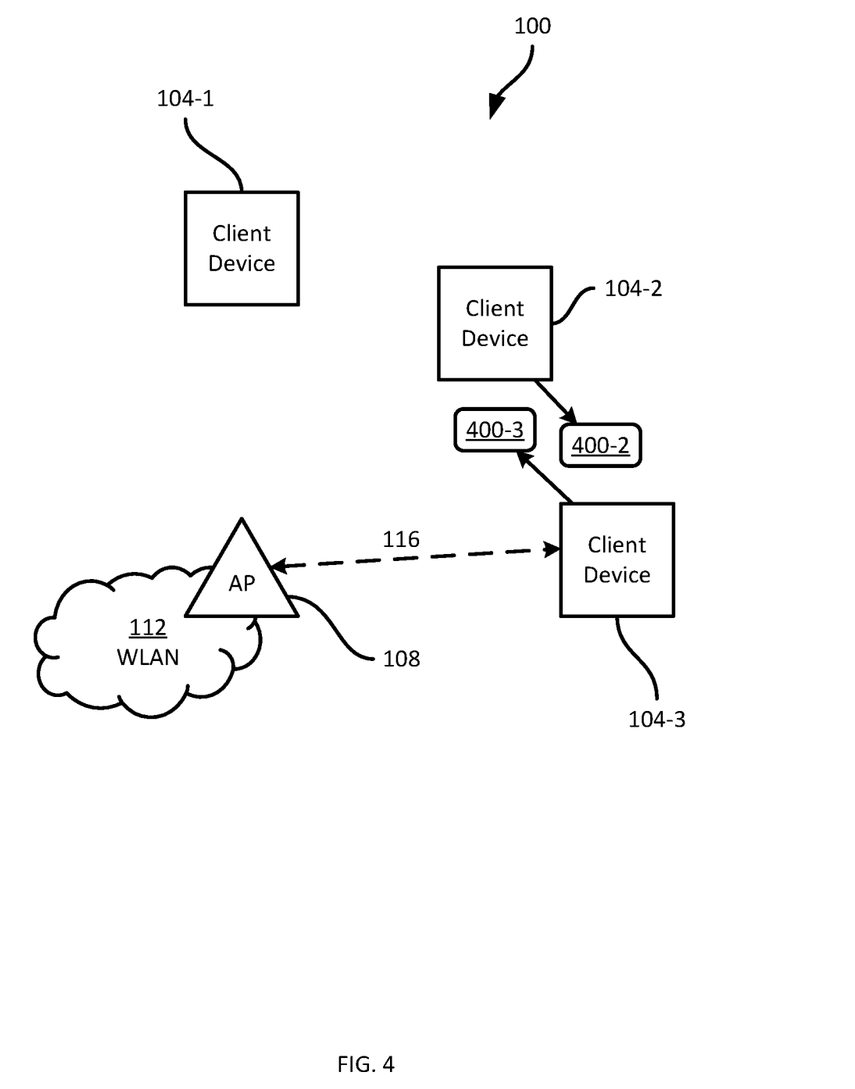
FIGS. 4-6 illustrate a performance of the method of FIG. 3 in the system of FIG. 1.

At block 305, the client device 104 is configured to transmit local operational capability data to at least one other client device 104. The local operational capability data defines at least one operational capability of the sending client device. Thus, referring to FIG. 4, in an example performance of the method 300 in which the client devices 104-2 and 104-3 seek to establish a direct communication session, the client device 104-2 performs block 305 by transmitting local operational capability data 400-2, while the client device 104-3 performs block 305 by transmitting local operational capability data 400-3.

At block 310, the client device 104 is configured to receive remote operational capability data, which was transmitted by another client device 104 (via a performance of block 305 by that other client device 104). Continuing with the example shown in FIG. 4, the receipt of operational capability data 400-2 at the client device 104-3 constitutes a performance of block 310, as does the receipt of operational capability data 400-3 at the client device 104-2.

The client devices 104 are configured to exchange operational capability data at blocks 305 and 310, in the present example, via an exchange of probe request and probe response messages. For example, as will be apparent to those skilled in the art, a device discovery mechanism specified by the Wi-Fi Direct standard calls for each device 104 to discover other devices 104 by transmitting probe request messages, and by responding to any received probe request messages with a probe response message.

In the present example, the data 400-2 and 400-3 are transmitted by the devices 104-2 and 104-3, respectively, during the above-mentioned discovery mechanism. For example, the client device 104-2 may be configured to transmit a probe request message containing the data 400-2, and upon detecting the probe request message containing the data 400-2, the client device 104-3 is configured to return a probe response message containing the data 400-3. A variety of other messages may also be employed by the devices 104 to exchange operational capability data, including beacon messages, action messages, and the like. As will be apparent from the above, blocks 305 and 310 need not be performed in the order shown. That is, block 310 can precede block 305 in some embodiments.

The probe requests and responses employed by the client devices 104-2 and 104-3 include data such as device identifiers (e.g. MAC addresses or the like) as well as a "P2P information element" (P2P IE) containing one or more device attributes. In the present example, a modified P2P IE is employed by each client device 104 to carry the operational capability data mentioned above. In particular, in the present embodiment, the P2P IE contains an operational capability data field including a set of subfields. The set of subfields includes at least one subfield, and each subfield contains an operational parameter of the device 104. A variety of operational parameters are contemplated for transmission in the operation data 400. Certain example operational parameters are shown in Table 1 below, which illustrates the content of both operational capability data 400-2 and operational capability data 400-3.

TABLE 1

Example Operational Capability Data

| | 400-2 | 400-3 |
|---|---|---|
| Concurrent connection? | No | Yes |
| Clients supported | 3 | 3 |
| MIMO configuration | 1 × 1 | 2 × 2 |

Three example operational parameters are shown above. Thus, in the present example, in which an extension of the Wi-Fi Direct P2P IE is employed to carry the operational capability data 400, the P2P IE is modified to include three additional subfields. The example operational parameters exchanged by the devices 104 in the present example include an indication of whether or not a concurrent connection with an access point (e.g. the access point 108) is currently active. As shown above, and as is evident from FIG. 1, the device 104-3 has an active connection 116 with the access point 108, and therefore the indication is set to "yes" in the data 400-3. The device 104-2, on the other hand, is not connected to the access point 108, and the indication is therefore set to "no" in the data 400-2.

The operational parameters also include a maximum number of clients that each device 104 is capable of supporting in a direct communication session, when the client device 104 acts as the master device in the direct communication session. The number of clients supported is preconfigured, for example as a setting stored in association with the application 216. In the present example, both devices 104-2 and 104-3 have a maximum number of supported clients set to three.

The operational parameters further include an indication of the antenna configuration of the client device 104. In particular, the antenna configuration parameter indicates the number of simultaneous input and output streams ("multiple input multiple output", or MIMO) supported by the communications interface 212 of the client device 104. As shown in Table 1, the device 104-2 supports single input and output streams, while the device 104-3 supports two simultaneous input and output streams (e.g. because the communications interface 212 of the device 104-3 includes two physical antenna assemblies).

Additional operation parameters are contemplated beyond those shown above. For example, the operational capability data can also define operational parameters such as a battery level of the client device, a CPU utilization level of the client device 104, and the like.

Each client device 104 is also configured, at block 310, to compare the remote and operational capability data received at block 310 with the local operational capability data transmitted at block 305. At block 315, each client device 104 is configured to determine, based on the comparison, whether to establish the communication session as a master device. That is, each device 104 is configured to determine whether or not to act as the master device for the communication session.

The comparison at block 310 and determination at block 315, in general, seeks to determine which set of operational capability data (i.e. the local operational capability data or the remote operational capability data) indicates a greater capacity to assume the computational load of acting as the master device in a communication session. Each client device 104 may, for example, store a prioritization of operational parameters, and a criterion for each operational parameter defining how the corresponding operational parameter is assessed. An example prioritization, as well as assessment criteria, for the parameters of Table 1 is shown below in Table 2.

TABLE 2

Example Prioritization and Assessment Criteria

| Parameter | Priority | Criterion |
|---|---|---|
| Concurrent connection? | 1 | No > Yes |
| Clients supported | 2 | Highest = master |
| MIMO configuration | 3 | Highest = master |

Each client device 104 can store the data of Table 2 in association with the application 216, although it will be understood that the prioritization and criteria need not be stored in the same format as shown above. Table 2 indicates that the concurrent connection indicator has the greatest priority in selecting a master device for a communication session, and that a device with no concurrent connections is to be preferred to act as the master device (due to the additional computational load imposed by concurrent connections, which reduce the computational resources available to perform functions required of a master device). Further, Table 2 indicates that the device 104 (of those having exchanged operational capability data) having the highest maximum number of supportable clients is to be selected as the master device. Further still, Table 2 indicates that the device 104 capable of the highest number of simultaneous input/output streams (among the devices 104 having exchanged operational capability data) is to be selected as the master device.

In the present example, lower priority parameters are considered only if higher priority parameters are inconclusive. Thus, in the present example performance of the method 300 by the devices 104-2 and 104-3, the maximum number of supported clients and the antenna configuration parameters are not considered, because the device 104-3 has a concurrent connection and is therefore less desirable to act as the master device. If, in another example, neither of the devices 104-2 and 104-3 had active concurrent connections, the number of supportable clients would be compared, followed by (when the number of supportable clients is inconclusive) antenna configuration. In other embodiments, all operational parameters may be considered, for example by assigning score components to each parameter and combining the score components to generate a weighted score for each device 104.

At block 315, each device 104 is thus configured to determine, based on the prioritization and criteria noted above, whether to act as the master device. In the present example performance, as will now be apparent, the determination at block 315 as performed by the device 104-2 is to act as the master device, because the device 104-2 lacks a concurrent connection while the device 104-3 has an active concurrent connection. Further, the determination at block 315 as performed by the device 104-3 is to not act as the master device (i.e. to act as a slave device in the communication session) for the same reason.

When the determination at block 315 is to act as a master device, the client device 104 proceeds to block 320, at which the client device 104-2 sets a local intent parameter to a master value, and transmits the local intent parameter. The intent parameter, in the present example, is the group owner (GO) intent parameter specified by the Wi-Fi Direct standard. As will be apparent to those skilled in the art, the GO intent parameter has a value between zero and fifteen, and the participating device having transmitted the highest value becomes the master device (i.e. the group owner). At block 320, the client device 104 is therefore configured to set the GO intent parameter to a maximal value (i.e. 15), indicating an intention to act as the master device. In other embodiments, other master values can be employed for the local intent parameter can be employed, such as a binary flag indicating that the device 104 intends to act as master device.

Figure 5:
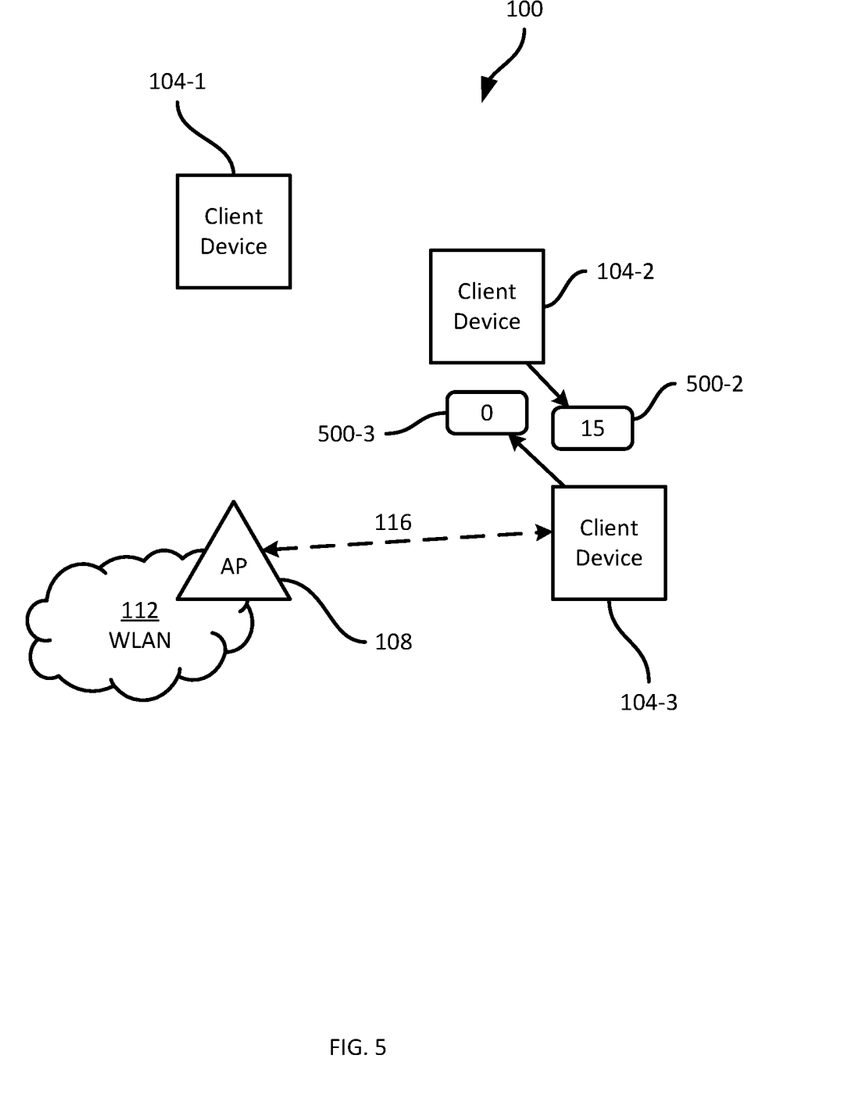

Referring briefly to FIG. 5, the client device 104-2 is illustrated as transmitting a local intent parameter with the value "15" in a message 500-2, which may be formatted as a GO negotiation message according to the Wi-Fi Direct standard.

Returning to FIG. 3, at block 325, when the determination at block 315 is to act as a slave device rather than as the master device, the client device 104 is configured to set a local intent parameter to a slave value rather than the above-mentioned master value, and to transmit the local intent parameter. In the present example, the slave value employed for the local intent parameter is a GO intent value of zero. Thus, in the example performance of the method 300 illustrated in FIG. 5, the device 104-3 is shown transmitting a message 500-3 (e.g. a GO negotiation message according to the Wi-Fi Direct standard) containing a local intent parameter with the value "0".

At blocks 330 and 335, respectively, the prospective master device 104 and the prospective slave device 104 are configured to receive remote intent parameters from any other devices participating in the session establishment process. Thus, referring again to FIG. 5, the device 104-2 performs block 330 via receipt of the message 500-3, and the device 104-3 performs block 335 via receipt of the message 500-2.

Having received the remote intent parameters, each client device 104 is configured to establish the communication session based on a comparison of the local and remote intent parameters, at blocks 330 and 345. Blocks 330 and 345 can be performed according to the conventional establishment procedure specified by the Wi-Fi Direct standard, for example. In general, the establishment of the session includes a determination by each client device 104 of whether the local or remote intent parameter is greater. The devices 104 are configured to exchange one or more messages confirming that the device 104 having the greatest intent parameter will assume the role of master device.

Through the performance of the method 300, the intent parameters evaluated at blocks 330 and 345 have not been selected randomly, as is conventional, but have instead been dynamically set based on the relative capabilities of the devices 104. Thus, the conventional negotiation process noted above typically results in the device 104 having set its local intent parameter to the master value (at block 320) being selected as the master device, and in the device 104 having set its local intent parameter to the slave value (at block 325) being selected as a slave device.

In certain performances of the method 300, at block 310 the comparison of local and remote operation capabilities reveals that the capabilities of the devices 104 seeking to establish a communication session are equal. In such a situation, each client device 104 is configured to determine, at block 315, to act as the master device. Thus, each participating device 104 transmits a local intent parameter having the master value at block 320. At block 330, the client devices 104 can be configured to determine whether the local and remote intent parameters are equal. When the local and remote intent parameters are equal, the client devices 104 can be configured to consult a tie-breaker bit included in the messages employed to exchange the intent parameters. In other embodiments, a secondary negotiation stage may be initiated under such conditions, in which random secondary intent values are exchanged by the devices having set intent parameters to the master value at block 320.

Figure 6:
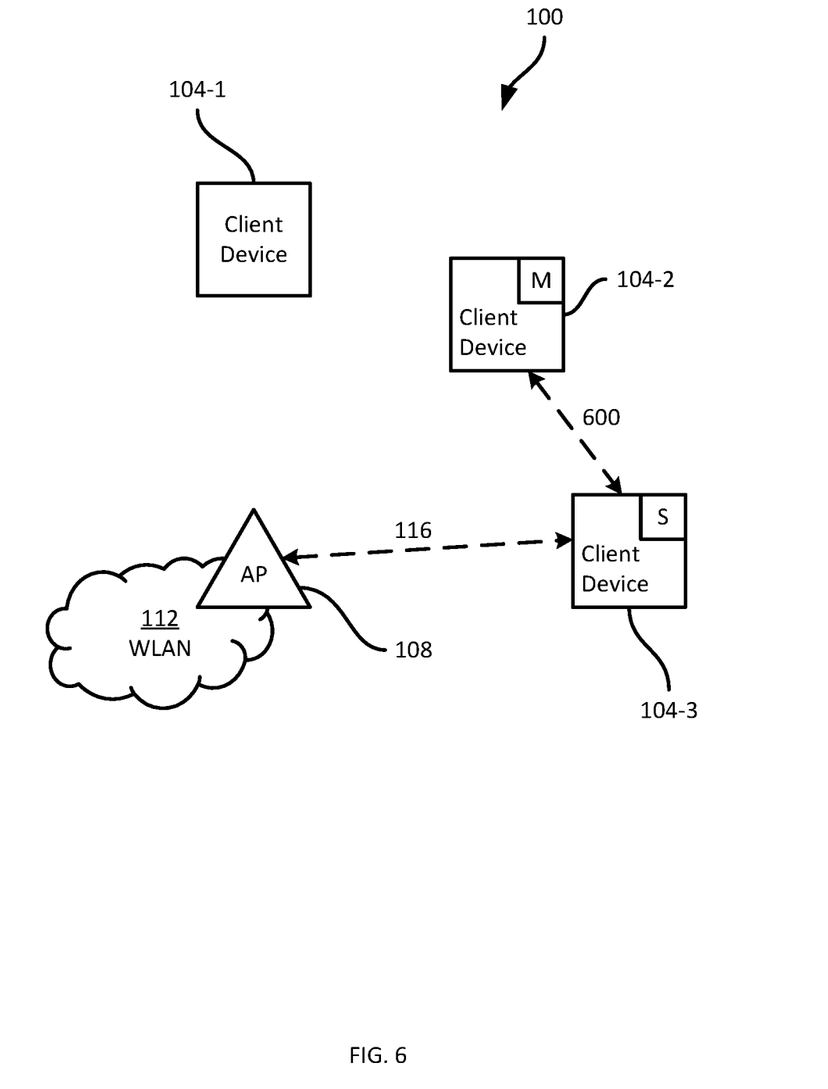

Following the performance of blocks 330 and 345, a communication session has been established and the client devices 104 can exchange data within the communication session. Referring to FIG. 6, the client devices 104-2 and 104-3 are shown having established a communication session over the direct connection 600, with the client device 104-2 acting as the master device (labelled with an "M"), and client device 104-3 acting as a slave device (labelled with an "S").

Figure 7:
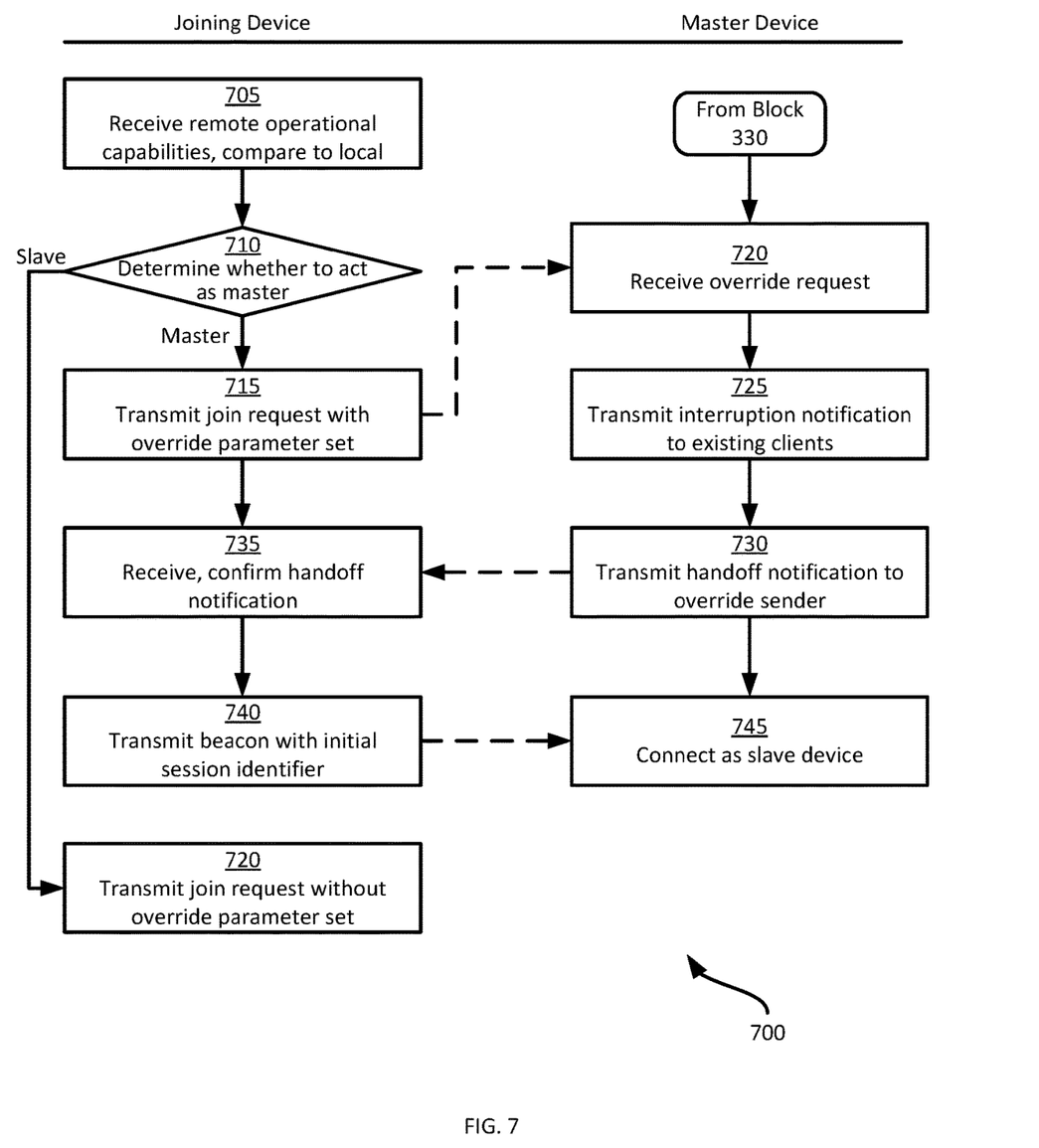
FIG. 7 is a flowchart of a method for dynamically reassigning the role of master device for an existing communication session.

The master device 104 in a communication session established via performance of the method 300 can be configured, following the performance of block 330, to implement additional functionality permitting the re-assignment of the master device role during the communication session, as illustrated in FIG. 7.

FIG. 7 illustrates a method 700 of dynamically reassigning the role of master device for an existing communication session. The performance of the method 700 will be described in conjunction with its performance in the system 100, and in particular following establishment of the communication session over the direct connection 600 as described above. More specifically, the client device 104-1 will be assumed to be seeking to join the communication session currently managed by the client device 104-2.

At block 705, the joining client device (i.e. the client device 104 not currently participating in the communication session) is configured to receive remote operational capability data corresponding to the current master device for the communication session. As will be apparent to those skilled in the art, the master device (e.g. the device 104-2 in the present example) is configured to transmit a beacon message at predetermined intervals. The beacon message contains a session identifier (e.g. a service set identifier, SSID), as well as the operational capability data of the master device. Upon receiving a beacon message, other client devices may request to join the communication session.

The joining client device 104 is also configured to compare the operational capability data received at block 705 to local operational capability data, and to determine, at block 710, whether to join the communication session as a master device. The comparison at block 705 and the determination at block 710 are performed as described above in connection with blocks 310 and 315, respectively. Table 3, below, illustrates example operational capability data for the device 400-1 alongside the previously described operational capability data for the device 400-2.

TABLE 3

Example Operational Capability Data

|  | 400-2 | 400-1 |
|---|---|---|
| Concurrent connection? | No | No |
| Clients supported | 3 | 4 |
| MIMO configuration | 1 × 1 | 2 × 2 |

As seen above, the determination at block 710 by the device 104-1 is to join the communication session as the master device, given that the concurrent connection parameter is inconclusive and the maximum number of supported clients favors the selection of the device 104-1 over the device 104-2 as the master device.

The device 104-1 therefore proceeds to block 715, at which the device 104-1 is configured to transmit a request to join the communication session. The request contains an override parameter indicating that the device 104-1 seeks to replace the current master device (device 104-2 in the present example). The override parameter can be a flag, such as a bit that is set to one to indicate an intention to replace the current master device and to zero otherwise.

When the determination at block 710 by the device 104-1 is to join as a slave device, the device 104-1 proceeds instead to block 720, and transmits a join request without the above-mentioned override parameter (e.g. with the override flag set to zero or simply omitted). The mechanism for joining a new device to a communication session as a further slave device is performed conventionally, and is therefore not described in further detail herein.

The current master device 104 (e.g. the device 104-2 in the present example) receives the join request containing an override parameter at block 720. In some examples, the join request includes the operational capability data of the device 104-1, and the device 104-2 can be configured to confirm that the device 104-1 is better suited to acting as the master device than the device 104-2 itself (e.g. by repeating a performance of blocks 310 and 315).

At block 725, the device 104-2 is configured to transmit an interruption notification to any existing slave devices that are party to the communication session. The interruption notification indicates to the slave devices that a re-assignment of the master device is underway. In the present example, the interruption notification is implemented as a modified "notice of absence" message. As will be understood by those skilled in the art, the notice of absence message is employed by master devices in Wi-Fi Direct sessions to indicate time periods during which the slave devices are not permitted to access the communications channel (e.g. permitting the master device to periodically disable its radio and reduce power consumption). The modified notice of absence messages employed in this embodiment include an override parameter, such as the above-mentioned re-negotiation or re-assignment flag. In response to the notice of absence message, each slave device is configured to cease accessing the channel employed for the communication session for a period of time specified in the notice of absence message.

Having transmitted the interruption notification to the slave devices, at block 730 the client device 104-2 is configured to transmit a handoff notification to the joining device 104 (e.g. the device 104-1 in the present example) indicating that the role of master device may now be reassigned. The handoff notification can include the session identifier (e.g. the above-mentioned SSID), and may also include other session data, such as the network identifiers currently assigned to each participating device 104.

At block 735, the joining device 104-1 is configured to receive and acknowledge receipt of the handoff message. The acknowledgement of the handoff message indicates to the current master device that it is relieved of the role of master device, and the device 104-2 ceases transmitting beacon messages. The device 104-1 is then configured, at block 740, to begin transmitting periodic beacon messages including the original session identifier. As will now be apparent, the transmission of beacon messages by the device 104-1 rather than the device 104-2 completes the reassignment of the master role to the device 104-1. The device 104-2 is configured to establish a direct connection with the device 104-1 as a slave device at block 745.

Variations to the above methods and systems are contemplated. For example, in some embodiments the performance of the method 700 can be initiated not only to join a previously non-participating device 104, but also to re-assign the role of master device to a device 104 currently participating as a slave device. For example, each device that is party to the communication session can be configured to periodically perform blocks 705 and 710. For example, changing network and device conditions may result in a different decision at block 710 than was originally made at block 315.

The remaining client devices 104 (e.g. the client device 104-3, in the present example) are configured to establish connections with the client device 104-1 upon expiry of the time period indicated in the interruption notification. Specifically, the remaining client devices 104 need not perform the discovery or negotiation mechanisms required at the establishment of a new session, because the original session identifier is contained in the beacon messages transmitted by the device 104-1. In some embodiments, the remaining slave devices are configured, responsive to the override parameter in the interruption notifications, to permit reconnection to a different master device upon expiry of the time period. In the absence of the above functionality, client devices performing conventional reconnections after a notice of absence period has expired may permit reconnection only to the same master device. Thus, in the present example the client devices 104 acting as slave devices in the communication session are configured to suppress the above restriction following the detection of an override parameter in a notice of absence message or other interruption notification.

Figure 8:
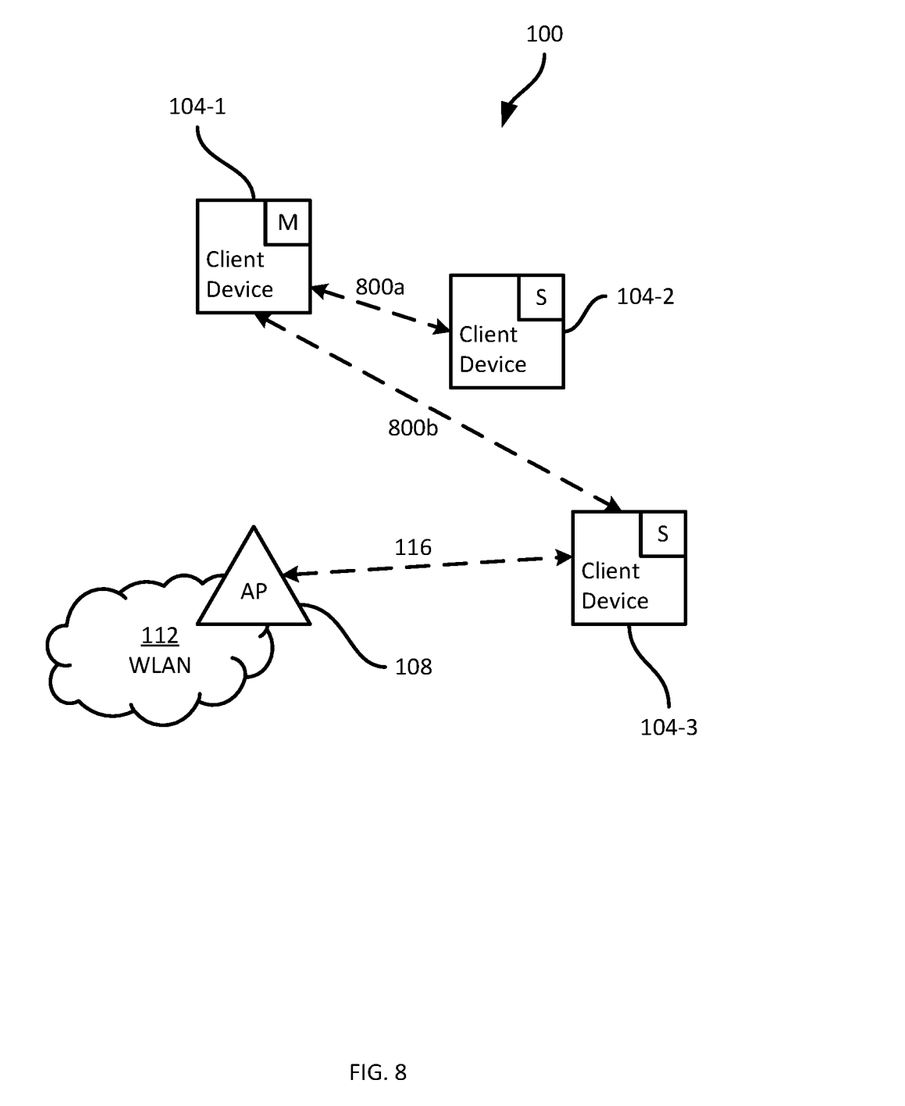
FIG. 8 illustrates a performance of the method of FIG. 7 in the system of FIG. 1.

Referring to FIG. 8, an updated illustration of the system 100 is shown, following performance of the method 800. In particular, the client device 104-1 is shown as the master device in a communication session defined by connections 800a and 800b between the device 104-1 and the devices 104-2 and 104-3, respectively.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including", "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A method of dynamically selecting a master device for a communication session from a set of peer devices, the method comprising:
   at a first device of the set of peer devices, transmitting local capability data to a second device of the set of peer devices, the local capability data defining an operational capability of the first device;
   at the first device, receiving remote capability data from the second device, the remote capability data defining an operational capability of the second device;
   comparing the local and remote capability data at the first device;
   based on the comparison, determining, at the first device, whether to establish the communication session as the master device; and
   at the first device, establishing the communication session with the second device according to the determination, wherein establishing the communication session with the second device comprises, at the first device:

when the determination of whether to establish the communication session as the master device is affirmative, setting a local intent parameter to a master value, transmitting the local intent parameter to the second device, receiving a remote intent parameter from the second device, and establishing the communication session as the master device when the local intent parameter is greater than the remote intent parameter.

2. The method of claim 1, wherein the local capability data includes one or more operational parameters of the first device, and wherein the remote capability data includes one or more operational parameters of the second device.

3. The method of claim 2, wherein the operational parameters include one or more of (i) an indication of an active concurrent connection with an access point, (ii) a preconfigured maximum number of supportable clients for the communication session, and (iii) an antenna configuration parameter.

4. The method of claim 3, wherein the antenna configuration parameter defines a number of simultaneous input and output streams.

5. The method of claim 2, wherein comparing the local and remote capability data includes:

traversing the operational parameters according to a preconfigured prioritization; and evaluating each operational parameter according to respective criteria.

6. The method of claim 1, further comprising:

transmitting a local tie-breaker value with the local intent parameter;

receiving a remote tie-breaker value with the remote intent parameter; and when the local intent parameter is equal to the remote intent parameter, establishing the communication session as the master device when the local tie-breaker value is greater than the remote tie-breaker value.

7. The method of claim 1, further comprising:

when the local intent parameter is equal to the remote intent parameter, initiating a secondary negotiation stage with the second device.

8. The method of claim 1, further comprising:

receiving, at the first device from a third device, a request to join the communication session including an override parameter;

responsive to the request, transmitting an interruption notification to the second device; and establishing a connection as a slave device with the third device.

9. A computing device, comprising:

a communications interface controllable to establish a communication session with a set of peer devices; and a processor connected with the communications interface, the processor configured to:

transmit local capability data via the communications interface to a second device of the set of peer devices, the local capability data defining an operational capability of the computing device;

receive, via the communications interface, remote capability data from the second device, the remote capability data defining an operational capability of the second device;

compare the local and remote capability data;

based on the comparison, determine whether to establish the communication session with the second computing device as a master device; and establish the communication session with the second device according to the determination by:

when the determination of whether to establish the communication session as the master device is affirmative, setting a local intent parameter to a master value, transmitting the local intent parameter to the second device, receiving a remote intent parameter from the second device, and establishing the communication session as the master device when the local intent parameter is greater than the remote intent parameter.

10. The computing device of claim 9, wherein the local capability data includes one or more operational parameters of the computing device, and wherein the remote capability data includes one or more operational parameters of the second device.

11. The computing device of claim 10, wherein the operational parameters include one or more of (i) an indication of an active concurrent connection with an access point, (ii) a preconfigured maximum number of supportable clients for the communication session, and (iii) an antenna configuration parameter.

12. The computing device of claim 11, wherein the antenna configuration parameter defines a number of simultaneous input and output streams.

13. The computing device of claim 10, wherein the processor is configured to compare the local and remote capability data by:

traversing the operational parameters according to a preconfigured prioritization; and evaluating each operational parameter according to respective criteria.

14. The computing device of claim 9, wherein the processor is further configured to:

transmit a local tie-breaker value with the local intent parameter;

receive a remote tie-breaker value with the remote intent parameter; and when the local intent parameter is equal to the remote intent parameter, establish the communication session as the master device when the local tie-breaker value is greater than the remote tie-breaker value.

15. The computing device of claim 9, wherein the processor is further configured to:

when the local intent parameter is equal to the remote intent parameter, initiate a secondary negotiation stage with the second device.

16. The computing device of claim 9, wherein the processor is further configured to:

receive, from a third device via the communications interface, a request to join the communication session including an override parameter;

responsive to the request, transmit an interruption notification to the second device; and establish a connection as a slave device with the third device.

17. A non-transitory computer-readable medium storing a plurality of executable instructions executable by a processor of a computing device, the instructions, when executed by the processor, cause the computing device to:

transmit local capability data via a communications interface of the computing device to a second device of the set of peer devices, the local capability data defining an operational capability of the computing device;

receive, via the communications interface, remote capability data from the second device, the remote capability data defining an operational capability of the second device;

compare the local and remote capability data;

based on the comparison, determine whether to establish the communication session with the second computing device as a master device; and establish the communication session with the second device according to the determination by:
- when the determination of whether to establish the communication session as the master device is affirmative, setting a local intent parameter to a master value,
- transmitting the local intent parameter to the second device,
- receiving a remote intent parameter from the second device, and
- establishing the communication session as the master device when the local intent parameter is greater than the remote intent parameter.

* * * * *